(No Model.)
J. A. GRAHAM.
CAR FENDER.
No. 572,601. Patented Dec. 8, 1896.
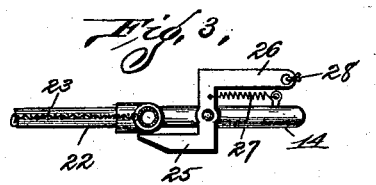
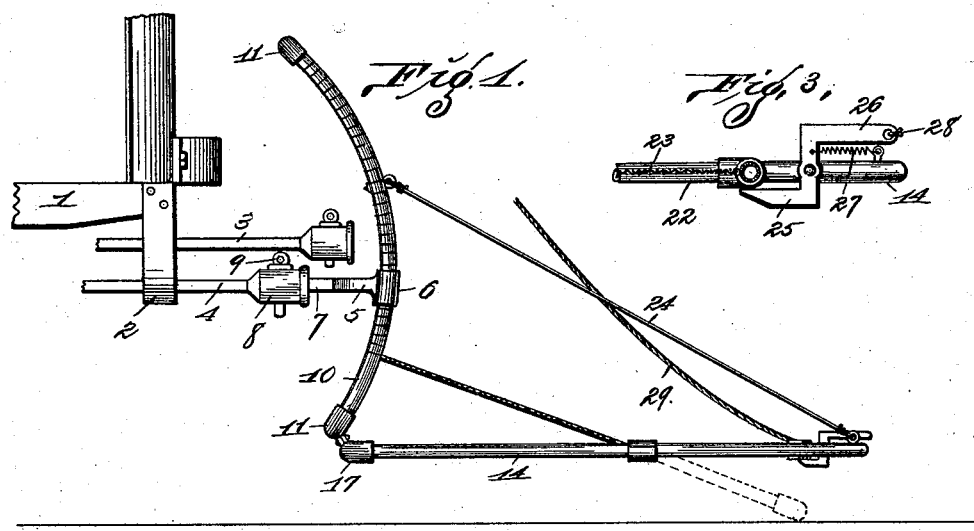
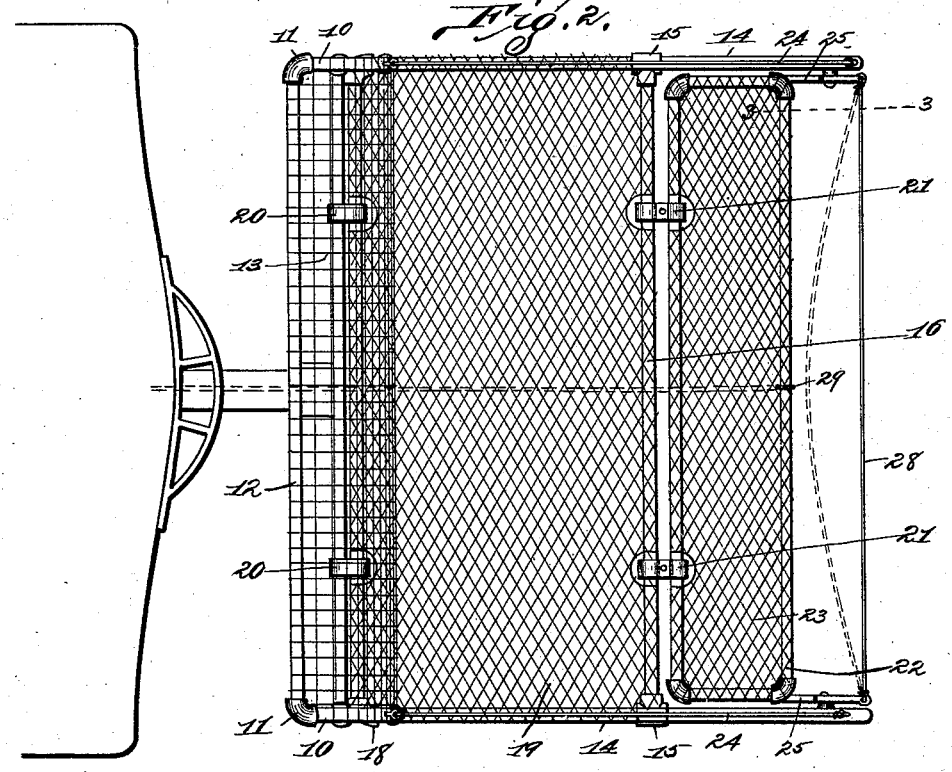
Attest:
W. F. Smith
S. G. Wells
Inventor:—
Jesse A. Graham
By Higdon Higdon & Longan
Atty's.

UNITED STATES PATENT OFFICE.

JESSE A. GRAHAM, OF ST. LOUIS, MISSOURI, ASSIGNOR OF ONE-HALF TO D. P. SHIELDS, OF SAME PLACE.

CAR-FENDER.

SPECIFICATION forming part of Letters Patent No. 572,601, dated December 8, 1896.

Application filed March 10, 1896. Serial No. 582,669. (No model.)

*To all whom it may concern:*

Be it known that I, JESSE A. GRAHAM, of the city of St. Louis, State of Missouri, have invented certain new and useful Improvements in Automatic Car-Fenders, of which the following is a full, clear, and exact description, reference being had to the accompanying drawings, forming a part hereof.

My invention relates to an improved car-fender; and it consists in the novel construction, combination, and arrangement of parts hereinafter described and claimed.

In the drawings, Figure 1 is a side elevation of my improved car-fender, a piece of the car-platform and the dashboard being shown. Fig. 2 is a top plan view of the parts shown in Fig. 1. Fig. 3 is an enlarged detail sectional view taken on the line 3 3 of Fig. 2.

Referring by numerals to the accompanying drawings, 1 is the front end of the car-platform, and 2 is a hanger depending from the end of said platform. The draw-rod 3 is fixed in the hanger 2 in the usual way. An arm 4 is fixed in the hanger 2 below the draw-rod 3. The arm 4 resembles the draw-rod, but it is used to carry my improved car-fender. A transversely-arranged bar 5, having its ends formed into vertical loops 6, is attached at its center to an arm 7, which projects rearwardly and is designed to be connected to the arm 4 by means of the hollow head 8 and the pin 9. The arm 7 has an aperture in its rear end through which the pin 9 passes after said arm has been inserted in the opening in the head 8. Vertically positioned in the loop 6 are bent pipes 10, having the elbows 11 on each end thereof, which elbows are connected by the transversely-positioned pipes 12, thus forming a rectangular convex frame, over which is stretched the wire-netting 13. Extending forwardly from the lower pipe 12 is a second rectangular pipe-frame consisting of the side pieces 14, near the center of which are T-couplings 15, which T-couplings are connected by the cross-piece 16. At the rear ends of said side pieces 14 are the elbows 17, which elbows are connected by the cross-piece 18. A wire-netting 19 is attached to the cross-piece 16 and extends backwardly and upwardly and connects with the lower edge of the netting 13, as shown in Fig. 1.

Clips 20 rigidly connect the cross-piece 18 and the lower pipe 12, as shown in Figs. 1 and 2. Clips 21 are fastened to the cross-piece 16 and project forward.

A rectangular frame 22 is covered with wire-netting 23, and one side of said frame is journaled in the forward ends of the clips 21, as shown in Fig. 2. Stay-rods 24 are attached to the forward ends of the side pieces 14 and extend rearwardly and upwardly and connect with the curved pipe 10, as shown in Fig. 1.

Bell-crank levers 25, having forwardly-projecting arms 26, are pivoted inside of the forward end of the side pieces 14, as shown in Fig. 2. A retractile coil-spring 27 is attached to the upper end of the bell-crank and to the extreme forward end of the side pieces 14 for the purpose of holding said bell-crank in position. The lower end of the bell-crank lever 25 is normally positioned under the forward corners of the rectangular frame 22 to hold the frame in a normal and horizontal position. The forward ends of the forwardly-projecting arms 26 are connected by a cord or wire 28, as shown in Fig. 2. A rope 29 is attached to the center of the forward side of the rectangular frame 22 and extends upwardly to the top of the dashboard, where it may be retained in any convenient position for the motorman to operate.

In the operation of my improved car-fender it is placed in position upon the car by inserting the arm 7 in the head 8 of the arm 4 and placing the pin 9 in position, as heretofore described. The rectangular frame 22 is raised to a horizontal position and retained there by the bell-crank levers 25. The fender may be positioned with the side pieces 14 three or four inches above the track, as desired. Whenever in the running of the car the cord 28 strikes an obstruction, the arms 26 will operate the bell-crank levers 25 and allow the rectangular frame 22 to drop down upon the ground or track, as shown by dotted lines in Fig. 1. By this means the obstruction will be thrown upon the wire-netting 23 and 19 and carried safely along thereby. When the obstruction has been removed from the netting, the motorman pulls the cord 29, and raises the forward edge of the rectangular frame 22 again into position, where it is held by the bell-crank levers 25 as before until another obstruction repeats the operation just described.

An improved car-fender of my construction is very effective in saving from injury persons who may be run down by the car and who would otherwise either be roughly thrown from the track or crushed by the car-wheels.

I claim—

1. In a car-fender, a bottom comprising two pieces hinged together on a line transversely of the car-track, means of holding the rear one of said pieces rigidly in position relative the car, and means of holding the forward one of said pieces normally in position relative to the car, a feeler in front of said bottom and connections between said feeler and said forward piece by which the forward edge of said forward piece is dropped to the car-track or pavement before reaching an obstruction, for the purposes stated.

2. In a car-fender, a bottom comprising two pieces hinged together on a line transversely of the car-track, means of holding the rear one of said pieces rigidly in position relative the car, and means of holding the forward one of said pieces normally in position relative to the car, a feeler in front of said bottom and connections between said feeler and said forward piece by which the forward edge of said forward piece is dropped to the car-track or pavement before reaching an obstruction, and a back extending upwardly from the rear edge of said stationary bottom, for the purposes stated.

In testimony whereof I affix my signature in presence of two witnesses.

JESSE A. GRAHAM.

Witnesses:
EDWARD E. LONGAN,
C. A. WOOD.